United States Patent [19]

Fujiura et al.

[11] Patent Number: 5,071,460
[45] Date of Patent: Dec. 10, 1991

[54] PROCESS FOR THE PREPARATION OF FLUORIDE GLASS AND PROCESS FOR THE PREPARATION OF OPTICAL FIBER PREFORM USING THE FLUORIDE GLASS

[75] Inventors: Kazuo Fujiura; Yasutake Ohishi; Michiya Fujiki; Terutoshi Kanamori; Shiro Takahashi, all of Mito, Japan

[73] Assignee: Nippon Telegraph and Telephone Corporation, Tokyo, Japan

[21] Appl. No.: 317,679

[22] Filed: Mar. 1, 1989

[30] Foreign Application Priority Data

| | | |
|---|---|---|
| Mar. 4, 1988 [JP] | Japan | 63-49797 |
| Nov. 2, 1988 [JP] | Japan | 63-276007 |
| Jan. 27, 1989 [JP] | Japan | 1-16403 |
| Mar. 1, 1989 [JP] | Japan | 1-49277 |

[51] Int. Cl.$^5$ .............................. C03B 37/18
[52] U.S. Cl. ..................... 65/3.12; 65/18.2; 65/DIG. 16
[58] Field of Search ............ 65/2, 3.01, 3.11, 3.12, 65/3.15, 3.31, 13, 18.1, 30.1, 31, 32.5, 900, DIG. 16, 18.2; 427/163, 166, 167

[56] References Cited

U.S. PATENT DOCUMENTS

| | | | |
|---|---|---|---|
| 4,378,987 | 4/1983 | Miller et al. | 65/3.12 |
| 4,711,652 | 12/1987 | Roba | 65/DIG. 16 |
| 4,718,929 | 1/1988 | Power et al. | 65/3.12 |

FOREIGN PATENT DOCUMENTS

| | | | |
|---|---|---|---|
| 0135903 | 4/1985 | European Pat. Off. | 65/DIG. 16 |
| 0196665 | 10/1986 | European Pat. Off. | 65/3.12 |
| 0175743 | 10/1982 | Japan | 65/DIG. 16 |
| 0005046 | 1/1985 | Japan | 65/3.12 |
| 0086039 | 5/1985 | Japan | 65/DIG. 16 |

OTHER PUBLICATIONS

Seiko Mitachi et al., "Preparation of Low Loss Fluoride Glass Fibers", Japanese Journal of Applied Physics, vol. 21, No. 1, pp. L55–L56 (1982).

*Primary Examiner*—Peter Kratz
*Attorney, Agent, or Firm*—Frishauf, Holtz, Goodman & Woodward

[57] ABSTRACT

Provided is a process for preparing a homogeneous fluoride glass containing high purity $BaF_2$ through the CVD process characterized in that the used gaseous mixture comprising: a barium $\beta$-diketonate complex serving as a first starting material and represented by the following general formula (1) of:

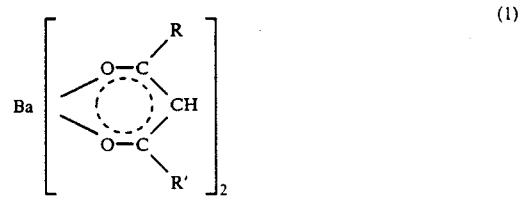

wherein R is an alkyl group having 1 to 7 carbon atoms, R' is a substituted alkyl group having fluorine atoms substituting hydrogen atoms and represented by $C_nF_{2n+1}$ where n is an integer of from 1 to 3;

a gaseous or vaporizable compound of the metallic element constituting said fluoride glass, the gaseous or vaporizable compound serving as a second starting material; and a fluorine-containing gas serving as fluorinating agent. Further provided is a process for preparing a preform for a fluoride optical fiber which is low in transmission loss, by depositing the fluoride glass over the interior wall of a cylindrical tube or the wall of rod-like glass substrate through the CVD process followed by collapsing.

28 Claims, 7 Drawing Sheets

PROCESS FOR THE PREPARATION OF FLUORIDE GLASS AND PROCESS FOR THE PREPARATION OF OPTICAL FIBER PREFORM USING THE FLUORIDE GLASS

BACKGROUND OF THE INVENTION

1. Field of art

The present invention relates to a process for the preparation of a highly homogeneous fluoride glass which may be used as a material for optical fibers, laser glasses, glass coatings and lens, and also to a process for the preparation of a fluoride optical fiber and a preform therefor which can provide a long optical fiber having low transmission loss.

2. Prior Art Statement

Fluoride glasses have heretofore been known as optimal materials for optical fibers, glass coatings or films, laser glasses and lens because of their excellent transmission properties within the infrared region range, and are as glass materials for optical fibers which are better than silica glasses because they have transmission losses of less than $10^{-2}$ dB/km which is superior to the silica glasses.

U.S. Pat. No. 4,718,929 discloses a CVD (chemical vapor deposition) process for preparing metal halides. This prior publication discloses a CVD process for preparing a metal halide glass material which may be used to produce optical fibers used in the infrared region or other optical members, wherein a $\beta$-diketone complex containing a fluoride of Be or Al is decomposed in a gaseous phase without using highly corrosive hydrogen fluoride (HF) gas to deposit a $BeF_2$ (85 to 100 mol %)/$AlF_3$ (15 to 0 mol %) glass on a substrate. However, strong toxicity and deliquescence of $BeF_2$ system glasses obstacle practical application thereof. Moreover, the specification of this prior patent fails to describe the preparation of fluoride glasses containing Ba.

U.S. Pat. No. 4,378,987 discloses a low temperature process for the preparation of an optical fiber in which an organic metal compounds is used. In this prior art process, a gaseous halogenation agent, such as $BF_3$, $SiF_4$, $COF_2$, HF, HCl, $SiCl_4$ or $BCl_3$, is used for preparing a metal halide so that the halogenation agent is reacted with a gaseous reactant of an organic metal compound to produce a glass material made of a solid metal halide. However, the specification of this patent does not disclose the use of complexes of Ba and $\beta$-diketones.

In conventional processes, fluoride glasses are generally produced through a so-called batch melting process in which solid materials are used. In the batch melting process, solid materials are first weighed, followed by pulverization and mixing, and then the mixed materials are melted in a batch. Thereafter, the melt is rapidly cooled to produce a glass.

However, the process described in the preceding paragraph has the problems that the materials are apt to be contaminated with transition metals, such as iron, nickel, copper, chromium, cobalt, during the weighing and pulverization steps, and that the materials tend to absorb moisture. Since the impurities including transition elements have absorption peaks within the infrared region, they cause absorption loss within the infrared region of the resultant product. Absorbed water or moisture causes scattering loss. There is also a problem that the wall of a used melting apparatus is corroded during the step of melting the glass, leading to contamination of impurities. A further disadvantage is that a large size fluoride glass product cannot be produced since the melt is cast into a mold followed by rapid cooling.

Other processes disclosed for the preparation of a preform for optical fibers include a built-in-casting process (reference should be made to Japanese Journal of Applied Physics, Vol 21, No. 1, pp. 55 to 56 (1982)), and a modified built-in-casting process.

However, as has been described above, since a melt is cast into a mold, a large size preform cannot be produced. Furthermore, the known casting processes for production of a core cladding structure by a casting process include a process wherein a cladding glass melt is flowed out before the cladding glass melt has not solidified and then a core glass melt is cast (such a process being referred to as build-in-casting process), and a process wherein a core glass melt is cast above the cladding glass melt and the cladding glass melt is flowed out from the lower end as the core glass melt is in the semi-solidified state so that the core glass is introduced into the center portion of the cladding glass (modified built-in-casting process). However, these known processes have the disadvantages that a preform for fibers which has uniform core/clad diameter ratio cannot be produced and that the refraction index profile of the resultant preform for fibers cannot be controlled.

On the other hand, the CVD process has been known as a process for preparing silicaglass optical fibers. It is suited for the synthesis of high purity homogeneous glass. However, when a glass is prepared by the CVD process, compounds of elements constituting the product glass must be heated to vaporize. Since the fluoride glass is mainly composed of compounds of alkali metals, alkaline earth metals and rare earth elements which are scarcely have sufficiently high vapor pressures at a relatively low temperature, it was difficult to prepare fluoride glasses by the CVD process.

OBJECT AND SUMMARY OF THE INVENTION

An object of this invention is to provide a process for preparing an optically uniform fluoride glass which may be used as optical fibers, glass coatings, lens or laser glass by a CVD process.

A further object of this invention is to provide a process for preparing a preform for optical fluoride glass fibers which are adapted for use to transmit light between long distances.

The tasks to be solved by the invention is to enable production of a fluoride glass containing barium through the CVD process by the development of a vaporizable material containing barium to provide a pure glass and to enable production of glass product on a large scale. According to a further advantageous feature of the invention, there is provided a process wherein a glass material is deposited internally of a cylinder followed by solidification by collapsing to prepare a preform for long length and low loss optical fiber of fluoride glass.

According to the first aspect of the invention, provided is a process for preparing a fluoride glass comprising the step of introducing a gaseous mixture into a reaction system containing a substrate to react the ingredients of said gaseous mixture in a gaseous phase or on said substrate to deposit a metal fluoride to form a fluoride glass, an improvement characterized in that said gaseous mixture comprising:

a barium-β-diketonate complex serving as a first starting material and represented by the following general formula (1) of:

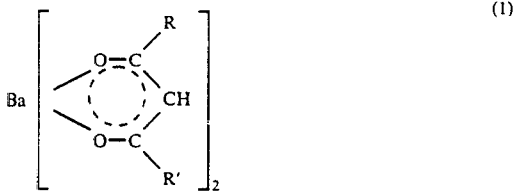

wherein R is an alkyl group having 1 to 7 carbon atoms, R' is a substituted alkyl group having fluorine atoms substituting hydrogen atoms and represented by $C_nF_{2n+1}$ where n is an integer of from 1 to 3;

a gaseous or vaporizable compound of the metallic element constituting said fluoride glass, the gaseous or vaporizable compound serving as a second starting material; and a fluorine-contained gas serving as fluorinating agent.

The above-noted structural formula (1) may also be depicted as shown in the structural formula below:

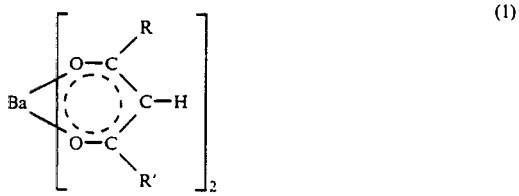

According to the second aspect of the invention, provided is a process for preparing a fluoride glass comprising the step of introducing a gaseous mixture into a reaction system containing a cylindrical substrate to react the ingredients of said gaseous mixture in a gaseous phase or on the interior wall of said substrate to deposite a layer or fine particles of a fluoride glass, an improvement characterized in that said gaseous mixture comprising:

a barium β-diketonate complex serving as a first starting material and represented by the following general formula (1) of:

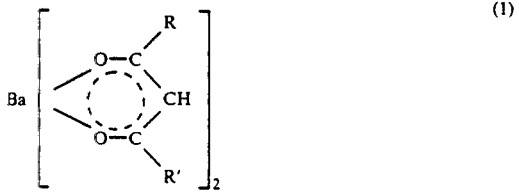

wherein R is an alkyl group having 1 to 7 carbon atoms, R' is a substituted alkyl group having fluorine atoms substituting hydrogen atoms and represented by $C_nF_{2n+1}$ where n is an integer of from 1 to 3;

a gaseous or vaporizable compound of the metallic element constituting said fluoride glass, the gaseous or vaporizable compound serving as a second starting material; and a fluoride-contained gas serving as a fluorinating agent.

The process being further characterized in that said cylindrical substrate containing therein deposited layer or fine particles of a fluoride is heated to solidify by collapsing the same to form a preform for optical fibers.

In the process of the invention, the first starting material is a barium β-diketonate complex, and the second starting material is a gaseous and/or vaporizable compound of one or more metals, other than barium, which can constitute a fluoride glass. The gaseous and/or vaporizable compounds which may be used as the second starting material include metal halides, organic metal compounds and metal-β-diketonate complexes. Examples of metal halides are halides of metal elements such as the Group Ia, Group IIa, Group IIIa, Group IVa, Group Va, Group Ib, Group IIb, Group IIIb, Group IVb, Group Vb, Group VIb, Group VIIb and Group VIIIb elements. Illustrative examples of the organic metal compounds are trialkyl aluminum and tetraalkoxy titanium. Gaseous or vaporizable metals which constitute complexes with δ-diketone include Li and Na of the Group Ia elements, Be, Ca and Sr of the Group IIb elements, Al and In of the Group IIIa elements, Sn and Pb of the Group VIa elements, Sb and Bi of the Group Va elements, Cu of the Group Ib elements, Zn and Cd of the Group IIb elements, Y, La, Ce, Pr, Nd, Pm, Sm, Eu, Gd, Tb, Dy, Ho, Er, Tm, Yb and Lu of the Group IIIb elements, Ti, Zr, Hf and Th of the Group VIb elements, V, Nb and Ta of the Group Vb elements, Cr, Mo and W of the Group VIb elements, and Fe, Co and Ni of the Group VIIIb elements. These metal elements constitute complexes with β-diketone, and the complexes thus formed have high vapor pressures at relatively low temperature. Two or more of these complexes of metals with β-diketone may be used in the CVD process for the preparation of a fluoride glass.

The barium-β-diketonate complexes are complexes of barium with a diketone represented by the general formula of R—CO—CH—CO—R' wherein R is an alkyl group having 1 to 7 carbon atoms, R' is a fluorinated alkyl group $C_nF_{2n+1}$ which is produced by substituting hydrogen atoms in alkyl groups by fluorine atoms, and n is an integer of from 1 to 3. Examples of the alkyl group include methyl, ethyl, propyl, butyl, heptyl, phenyl, tertiary butyl and isopropyl groups. Trivial names and abridged notations of beta-diketones which may be used in this invention will be set forth in Table 1.

TABLE 1

| | Ligand Compound; Formula | Trivial Names (Symbol) |
|---|---|---|
| 1 | $(CH_3)_3C—CO—CH_2—CO—C(CH_3)_3$ 2,2,6,6,-tetramethyl 3,5-heptanedione | Dipivaloyl-methane (TMH) |
| 2 | $CH_3CH_2CH_2—CO—CH_2—CO—C(CH_3)_3$ 2,2-dimethyl 3,5-octanedione | (DMO) |
| 3 | $CF_3—CO—CH_2—CO—C(CH_3)_3$ 2,2-dimethyl 6,6,6-trifluoro-3,5-hexanedione | Pivaloyltrifluoro-methyl Acetylacetone (PTA) |
| 4 | $CF_3—CO—CH_2—CO—CF_3$ 1,1,1,5,5,5-hexafluoro 2,4-pentanedione | Hexafluoroacetyl-acetone (HFA) |
| 5 | $CF_3—CO—CH_2—CO—CH_3$ 5,5,5-trifluoro 2,4-pentanedione | Trifluoroacetyl-acetone (TFA) |
| 6 | $C_2F_5—CO—CH_2—CO—C(CH_3)_3$ 2,2-dimethyl 6,6,7,7,7-pentafluoro 3,5-heptanedione | (DPH) |
| 7 | $C_3F_7—CO—CH_2—CO—C(CH_3)_3$ 2,2-dimethyl 6,6,7,7,8,8,8- | (DHO) |

TABLE 1-continued

| Ligand Compound: Formula | Trivial Names (Symbol) |
|---|---|
| heptafluoro 3,5-octanedione | |

Fluorine-containing gas used in this invention include fluorine gas, and gaseous compounds of fluorine with one or more of hydrogen, halogen elements other than fluorine, carbon, nitrogen, boron, sulfur and silicon. One or more of such gases may be used singly or in combination.

BRIEF DESCRIPTION OF THE DRAWINGS

Appended drawings include schematic illustrations of processing apparatus which may be used to practice the invention wherein.

DETAILED DESCRIPTION OF THE INVENTION

Figure 1:
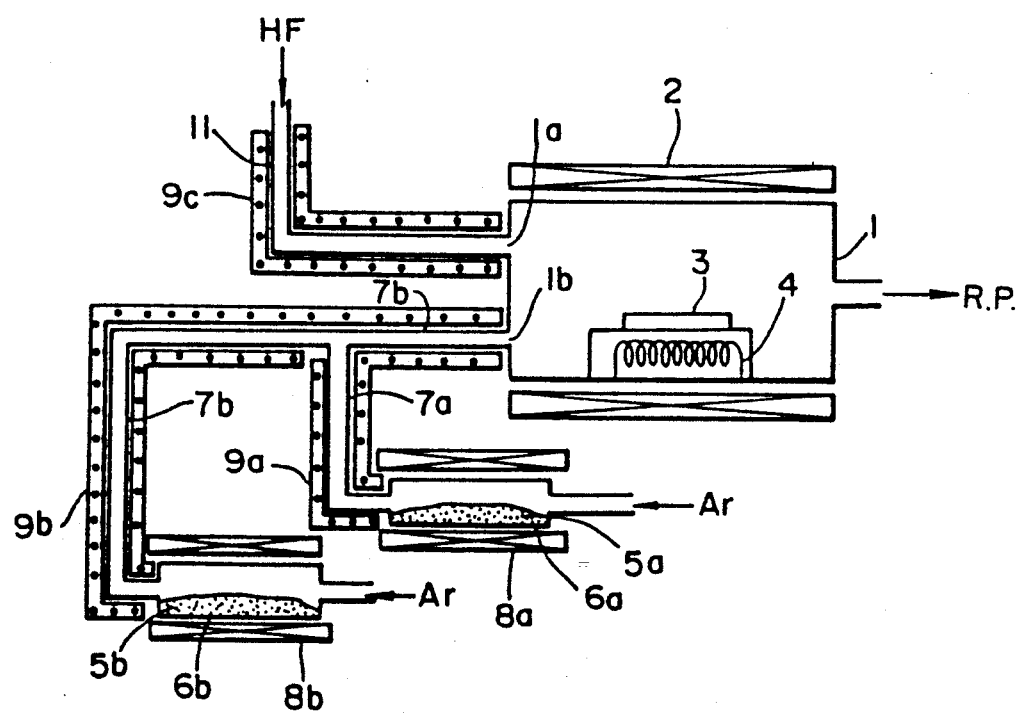
FIG. 1 is a schematic illustration showing an apparatus for preparing a fluoride glass according to one embodiment of the invention.

In the process of the present invention, the barium-$\beta$-diketonate complex which constitutes the vaporizable first component and or vaporizable second component containing one or more of metal halides and $\beta$-diketonate complexes of metals other than barium may be reacted with a fluorine-containing gas through the CVD technique at a temperature of 0° C. to 500° C. and at a pressure of atmospheric pressure or subatmospheric pressure.

The substrate contained in a reaction section of the reactor should have a thermal expansion coefficient approximately equal to that of the produced fluoride glass in order that the substrate causes no stress or strain to the resultant fluoride glass during the cooling step, the substrate being desirously made of a glass having excellent anticorrosive property. The fluoride glass formed is pertinently a so-called fluoride glass or calcium fluoride.

The temperature of the substrate is maintained in a temperature of not higher than the crystallization temperature of the formed fluoride glass, preferably not higher than the glass transition temperature of the formed fluoride glass.

One or more vaporized complexes of $\beta$-diketone and metals and fluorine-containing gases, which are introduced into the reaction section of the reactor, are reacted on the surface of the substrate or in the gas phase to form a fluoride glass. As to the configuration or state of the formed fluoride glass, a glass film or coating is formed when the fluorination reaction takes place on the surface of the substrate, and fine particles are formed due to homogeneous nucleation when the fluorination reaction takes place in the gas phase. Irrespective of either state or configuration the fluoride glass has, the vaporised complexes of $\beta$-diketone and metals and fluorine-containing glass are absorbed on the surface of the substrate or the surfaces of fine particles by chemical adsorption, and then the complexes of $\beta$-diketonate and metals and fluoride-containing gases react accompanying with thermal decomposition to form fluorinated metal fluorides. When the temperature of the substrate or the temperature of gas phase is maintained at a temperature of not higher than the glass transition temperature of the formed fluoride glass, the mobility of fluoride molecules on the growing surface is maintained at a low level so that the random adsorption state of the metal-$\beta$-diketonate complexes is frozen even after the fluorination, for example, by HF gas. As a result, the amorphous state can be frozen without any special measure similarly as in the case of being rapidly cooled by quenching. Thus, a highly homogeneous fluoride glass containing no separated crystallite can be produced. A fluoride glass having a composition which could not be prepared by the conventional process because of the poor glass-forming ability can be prepared by the invention.

In the process for preparing a fluoride glass, according to the invention, fluoride glass coatings are serially deposited on the substrate, or alternatively fine particles of fluoride glass are initially formed and then solidified. Accordingly, by varying the reaction time, the thickness of the resultant fluoride glass coating may be easily controlled. Also, a large size fluoride glass block may be produced by continuing the reaction for a long time.

A further advantage of the process for preparing a fluoride glass, according to the invention, resides in exclusion of contamination by impurities from external sources. This is due to the fact that the starting organic metal compound, i.e. a metal-β-diketonate complex, is processed continuously from the vaporization thereof to the formation of a fluoride glass without exposure to air. A still further advantage of the process of the invention resides in exclusion of contamination caused by corrosion of the wall of the crucible or container used at the melting step, since a crucible or like container is not needed in practice of the process of the invention. Upon vaporization of the starting material, impurities, such as transition elements or metals, may be separated. Accordingly, a high purity fluoride glass containing extremely little impurity, which might cause absorption or scattering, can be prepared by this invention.

The preform for a fluoride optical fiber, according to the invention, may be produced initially by depositing a fluoride glass over the inner peripheral wall of a cylindrical substrate and then heating the cylinder to collapse the deposited glass. In accordance with the process of the invention, by heating the glass coating deposited over the inner wall of the cylinder or fine glass particles are heated to a temperature of not higher than the crystallization temperature of the formed glass while maintaining the pressure in the cylinder at a subatmospheric pressure, a preform may be produced by collapsing without causing crystallization of the formed glass. Prior to collapsing, oxygen-containing impurities, such as OH groups, adsorbed on the surface of the coating or fine particles of the granules are removed by heating the glass to a temperature of not higher than the glass transition temperature while purging the interior of the cylinder with a halogen-containing gas, such as $F_2$, $Cl_2$, $NF_3$, $CF_4$, $SF_6$, HF or HCl. These oxygen-containing impurities cause scattering by oxides if they remain in the product, and thus should be removed. According to a further aspect of the invention, one end of the produced preform may be drawn during the heating and collapsing step so that collapsing and drawing may be effected simultaneously.

Since oxygen-containing impurities are removed by the use of a halogen-containing gas and then a preform or an optical fiber can be produced without exposing to external environment, according to the process of the invention, the resultant fluoride optical fiber is free from absorption or scattering due to the presence of impurities and has the low transmission loss. Moreover, by varying the time during which the product glass is deposited, the core/cladding diameter ratio of the optical fiber can be easily controlled. The refractive index profile of the optical fiber can also be easily controlled by changing the feed rate of the starting material continuously. The cylindrical substrate on which the fluoride glass is deposited may be selected from any materials as far as they have the viscosities approximately equal to that of the product at the temperature at which collapsing or drawing is effected in addition to the condition that the interior wall of the cylindrical substrate withstands the corrosive reaction of the fluorine-containing gas. An example of such cylindrical substrate is a cylindrical tube made of a glass, metal or polymer or a tube having multi-layered structure made of one or more of glasses, metals and/or polymers. A large size preform may be produced by selecting a material from which a large size substrate tube is prepared, so that a long fluoride optical fiber may be produced therefrom.

The process for preparing a fluoride glass, according to the invention, realizes chemical vapor deposition of a fluoride glass which could not be practised by the conventional technology. The process of the invention produces a homogeneous fluoride glass which contains lesser amount of impurities as compared with those produced by the conventional melting processes. Alkali metals, and alkaline earth metals, the compounds thereof having high vapor pressures at low temperature being not known by now, form complexes with β-diketonate and the thus formed complexes have high vapor pressures at low temperature, so that the CVD process can be applied by using them to prepare fluoride glasses having the compositions which could not be produced by the conventional processes. Since the metal-β-diketonate complexes have high vapor pressures at low temperature, the processing temperature during the glass preparation step can be maintained at a low temperature. Thus, even a thermally unstable glass composition can be prepared at a temperature lower than the crystallization temperature thereof. Further, it is made possible to prepare a fluoride optical fiber having a controlled core/cladding diameter ratio and having controlled refractive index distribution, which could not be prepared by the conventional casting process.

An exemplified apparatus for preparing a fluoride glass, according to the invention, is shown in FIG. 1. Referring to FIG. 1, the interior of a reaction chamber 1 is controlled to have an adjusted reduced pressure by means of an evacuation system including a rotary pump, and has a fluorine-containing gas inlet 1a and a vaporizable material inlet 1b. The reaction chamber 1 is heated by a heater 2 surrounding the reaction chamber 1. At the substantial center of the reaction chamber 1, a substrate 3 is placed on Two evaporators 6a, 6b contains two different vaporizable materials 5a, 5b, and are connected to the vaporizable material inlet 1b of the reaction chamber 1 through vaporizable material feed pipes 7a, 7b which meet with each other upstream of the inlet 1b. Not-shown carrier gas introduction means are provided at the side opposite to the feed pipes 7a, 7b connected to the evaporators 6a, 6b so that a carrier gas, such as argon, is introduced into the reaction chamber 1. Each of the evaporators 6a, 6b is heated respectively by heaters 8a, 8b to a proper temperature. Outer peripheries of the feed pipes 7a, 7b are heated by heaters 9a, 9b. A fluorine-containing gas, such as hydrogen fluoride gas HF is supplied from the fluorine-containing gas inlet 1a through a fluorine-containing gas supply pipe 11 which is kept warm by a heater 9c.

The reaction chamber 1, the evaporators 6a, 6b and vaporizable gas feed pipes 7a, 7b may be made of aluminum, nickel, copper, iron or a nickel alloy of Ni—Cu system. It is preferred that aluminum is used for the material of these parts, since it is excellent in thermal conductivity to prevent condensation of the vaporizable materials and also anticorrosive to fluorine-containing gases. When aluminum is used to construct the reaction chamber 1, the evaporators 6a, 6b and vaporizable gas feed pipes 7a, 7b, the temperature in the apparatus is uniformalized to prevent condensation of the starting materials. As the result, a fluoride glass having a stable composition is prepared, and hydrogen fluoride (HF) gas and fluorine ($F_2$) gas which are effective fluorination agents for the fluorination of metal β-diketonate complexes may be used in the apparatus. Of course, contamination of impurities due to corrosion of the interior wall of the apparatus is excluded.

As the heat source for the heater 4, ultraviolet rays, infrared rays, far infrared rays, radio frequency induction plasma and microwave induction plasma may be used.

By the provision of a window made of, for example, CaF$_2$ over the substrate 3, the fluoride glass may be prepared while inspecting the depositing glass through a silica fiber scope.

Figure 2:
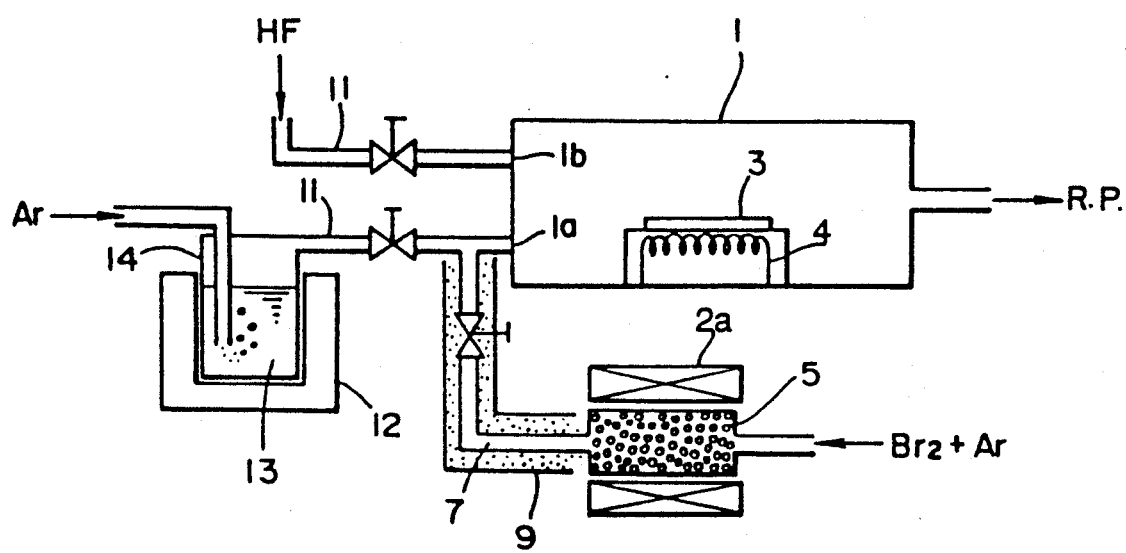
FIG. 2 is a schematic illustration showing another apparatus for preparing a fluoride glass according to another embodiment of the invention.

Another embodiment of the apparatus for preparing a fluoride glass is shown in FIG. 2, wherein aluminum reaction chamber 1 is maintained at a pressure of 10 mmHg by means of a rotary pump (RP). Within the reaction chamber 1 placed is a substrate 3 which is a plate of CaF$_2$. Only the substrate 3 is heated by a heater 4. The reaction chamber 1 has inlet ports 1a, 1b through which a gas stream containing an organic metal compound and a metal halide and a stream of a fluorine-containing gas are introduced. In a sublimation chamber, zirconium particles 5 are reacted with a bromine gas to form ZrBr$_4$. The reaction chamber 1 is supplied with ZrBr$_4$ while using argon as a carrier gas through a feed pipe 7 which is connected through a variable leak valve to the inlet port 1a.

On the other hand, a metal-β-diketonate complex of an organic metal compound is vaporized and fed to the reaction chamber 1 while using argon as a carrier gas. The inlet port 1a is connected to a feed pipe through a variable leak valve. A feed pipe 11a is connected to an evaporator 14 which is surrounded by a feed furnace 12, a beta-diketonate metal complex 13 being contained in the evaporator 14. Argon is introduced into the mass of metal-β-diketonate complex 13 while heating the evaporator 14 so that the vaporized metal-β-diketonate complex is fed to the reaction chamber 1.

As the fluorine-containing gas, hydrogen fluoride gas HF is fed through a feed pipe 11b and an inlet port 1b to the reaction chamber 1. A variable leak valve adjusts the feed rate of HF. A fluoride glass is deposited on the substrate 3 in the reaction chamber 1 by the thermal decomposition of the metal-β-diketonate complex and the fluorination by the metal halide and hydrogen fluoride gas.

Figure 3:
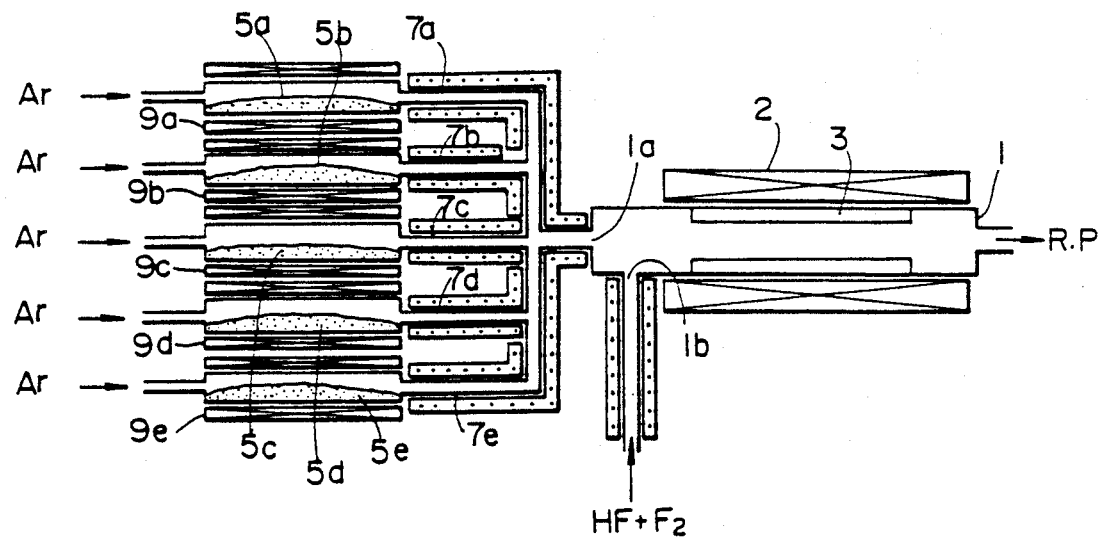
FIG. 3 is a schematic illustration of an apparatus for preparing a preform for a fluoride optical fiber.

FIG. 3 shows an apparatus for preparing a preform for fluoride optical fibers. In FIG. 3, a reaction chamber 1 is evacuated by an evacuation system having a rotary pump so that the pressure in the reaction chamber 1 is reduced to subatmosphric pressure. The reaction chamber 1 is made of aluminum and has an inlet port 1a through which a vaporizable starting material is introduced and another inlet port 1b through which a fluorine-containing gas is introduced. The reaction chamber 1 is maintained at 250° C., in its entirety, by a heater 2a, and the pressure in the chamber 1 is maintained at a pressure of 10 mmHg.

Into the reaction chamber 1, a cylindrical tube 3 is disposed and made of a fluoride glass having a composition in molar ratio of 39.7ZrF$_4$—13.3HfF$_4$—18.0BaF$_2$—4.0LaF$_3$—3.0AlF$_3$—22NaF. Through the inlet ports 1a, 1b of the reaction chamber 1 introduced are a gas flow of a metal-β-diketonate complex and a fluorine-containing gas, respectively.

EXAMPLES OF THE INVENTION

In order that the invention should be more fully understood, presently preferred Examples of the invention will be set forth below. However, it is to be noted that the following Examples are given by way of example only and not intended to limit the scope of the invention which is definitely recited in the appended claims.

EXAMPLE 1

In the apparatus shown in FIG. 1, a complex Zr(HFA)$_4$ which was a complex of hexafluoroacetylacetone (hereinafter referred to as HFA) and zirconium was used together with a complex Ba(DHO)$_2$ which was a complex of 2,2-dimethyl-6,6,7,7,8,8-heptafluoro-3,5-octanedione (hereinafter referred to as DHO) and barium. Hydrogen fluoride gas (HF) was used as the fluorine-containing gas. The interior of the reaction chamber 1 was maintained at a pressure of 10 mmHg, and maintained at 205° C. by using the heater 2. The substrate 3 is a CaF$_2$ plate which was heated to 250° C. by the heater 4.

Figure 4:
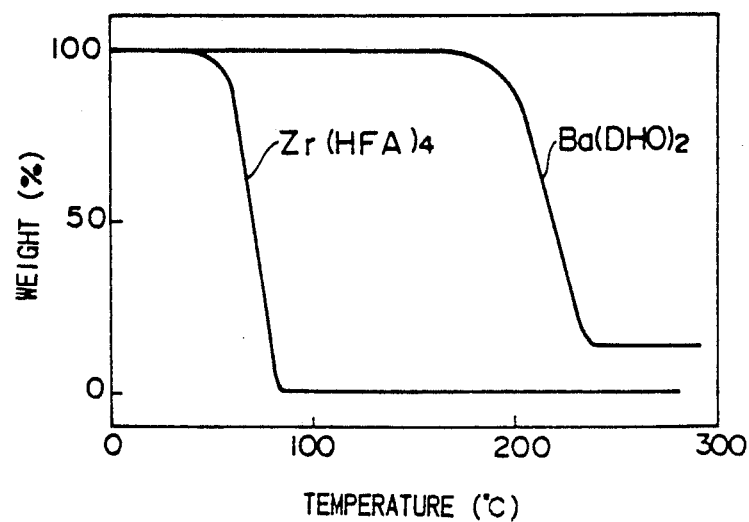
FIG. 4 is a graphic representation showing the results of thermogravimetric analysis of $Zr(HFA)_4$ and $Ba(DHO)_2$.

The results of thermogravimetric analyses of Zr(HFA)$_4$ and Ba(DHO)$_2$ used as the vaporization shown in FIG. 4. Weight decrease due to vaporization was observed at about 60° C. for Zr(HFA)$_4$ and at about 200° C. for Ba(DHO)$_2$. Zr(HFA)$_4$ was maintained at 60° C. in the evaporator 6a by means of the heater 8a and Ba(DHO)$_2$ was maintained at 200° C. in the evaporator 6b by means of the heater 8b. The vaporized gases were introduced into the reaction chamber 1 while being carried by argon supplied from a not-shown carrier gas supply means. The feed rate of HF was controlled by a mass flow controller. The feed pipes 7a, 7b and 11 were maintained, respectively, at 65° C., 205° C. and 30° C. by the heaters 9a, 9b and 9c.

Zr(HFA)$_4$ and Ba(DHO)$_2$ introduced in the reaction chamber 1 were converted into fluorides in the gaseous phase by the following reactions, and deposited on the substrate 3 to form a fluoride glass.

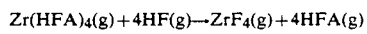

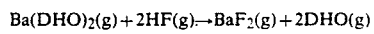

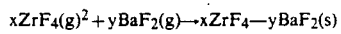

In the reaction equations set forth above, (g) indicates the gaseous state and (s) indicates the solid phase.

ZrF$_4$ and BaF$_2$ formed by the above reactions and deposited on the substrate 3 had low mobilities on the substrate since the temperature of the substrate was maintained at a temperature lower than the transition temperatures of the fluoride glasses, and thus frozen in situ without changing the positions. As a result, the non-equilibrium state was realized similarly as in the case of quenching. The fluoride glasses were serially deposited to prepare a glass coating or a glass bulk.

The fluorination reactions of Zr(HFA)$_4$ and Ba(DHO)$_2$ took place independently. The rates of preparation of ZrF$_4$ and BaF$_4$ by the reaction between Zr(HFA)$_4$ and HF and between Ba(DHO)$_2$ and HF were kept unchanged in the reaction of Zr(HFA)$_4$—Ba(DHO)$_2$—HF. Accordingly, the Zr/Ba ratio in the formed glass could be easily controlled by adjusting the flow rate of argon used as the carrier gas.

In this Example, Zr(HFA)$_4$ was supplied at a feed rate of 100 cc/min, Ba(DHO)$_2$ was supplied at a feed rate of 50 cc/min and HF was supplied at a feed rate of 150 cc/min and reaction was continued for 2 hours, whereby a glass block having a composition of 65ZrF$_4$—35BaF$_2$ was obtained.

Figure 5:
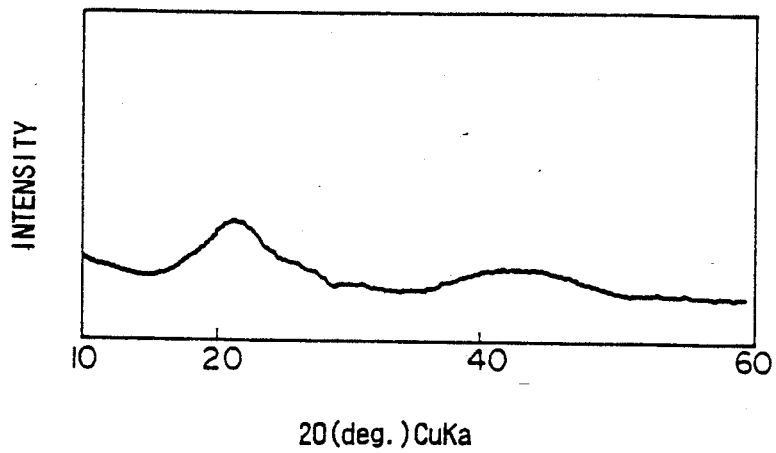
FIG. 5 is a chart of X-ray diffraction of the $65ZrF_4—35BaF_2$ glass.
Figure 6:
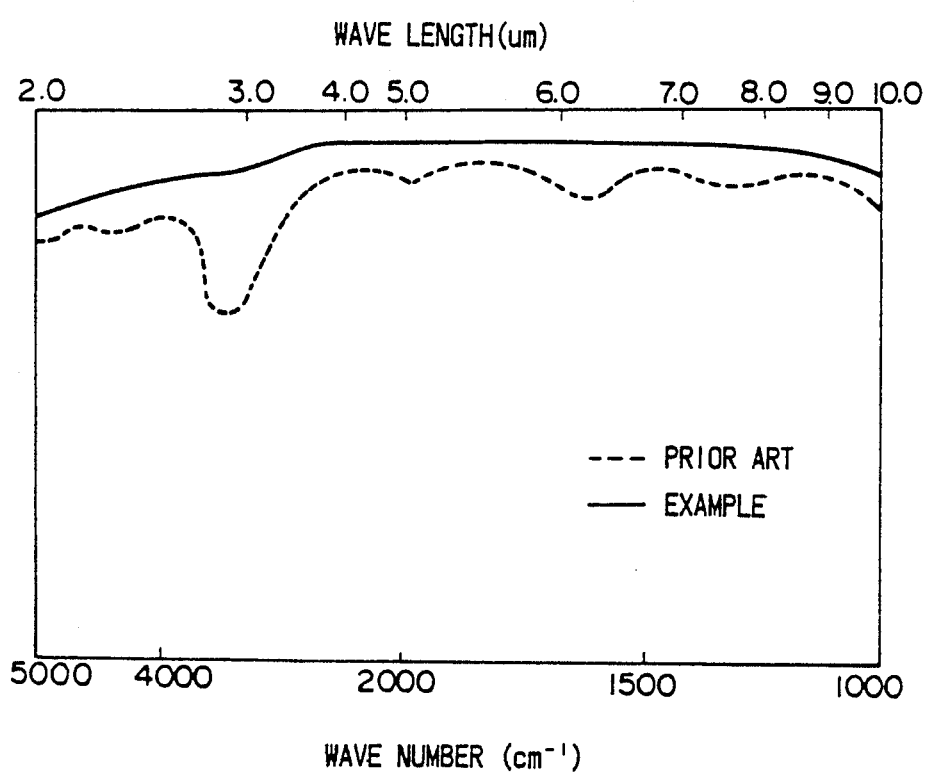
FIG. 6 is a chart showing by the real line the infrared absorption spectrum of the $65ZrF_4—35BaF_2$ glass, and also showing by the broken line the infrared absorption spectrum of a fluoride glass having the same composition and containing ZrF and $BaF_2$ in the same molar ratio but prepared by the conventional melting process.
Figure 7:
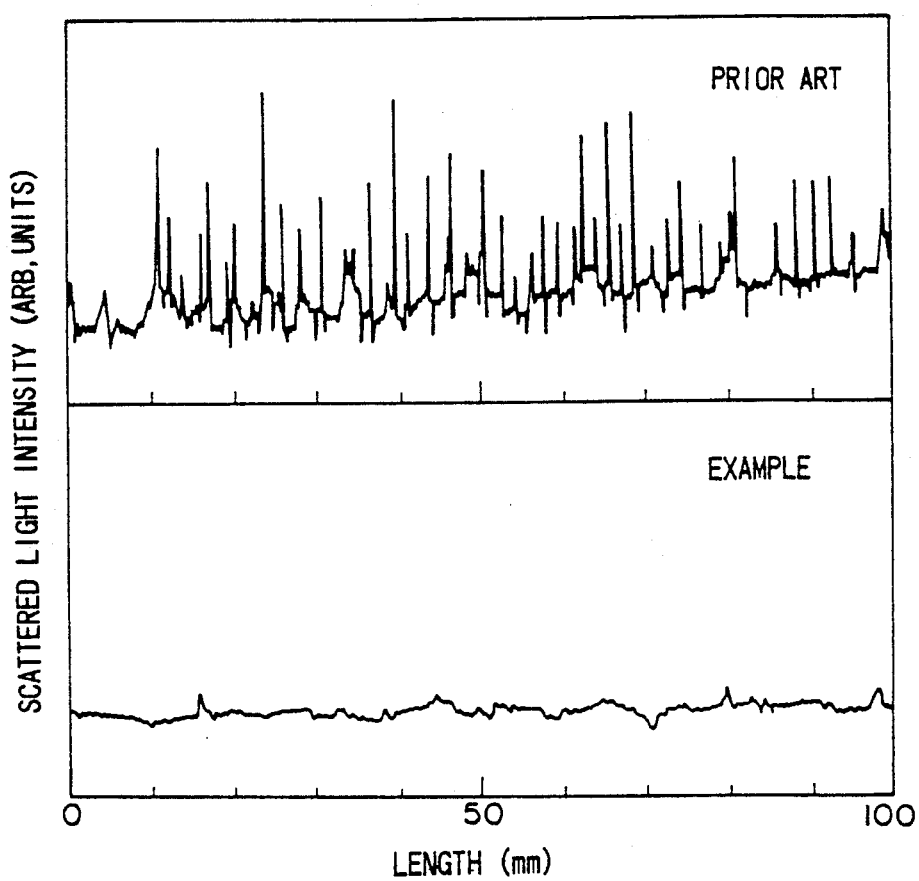
FIG. 7 contains upper and lower charts wherein the upper chart shows the scattering distribution of the $65ZrF_4—35BaF_2$ glass, and the lower chart shows the scattering distribution of a fluoride glass having the same composition and containing $ZrF_4$ and $BaF_2$ in the same molar ratio but prepared by the conventional melting process.

The X-ray diffraction chart of the thus prepared glass is shown in FIG. 5, and the infrared absorption spectrum chart is shown in FIG. 6. In FIG. 6, the infrared absorption spectrum of a fluoride glass having the same composition and prepared by the conventional melting process is shown by the broken line. The distribution of scattered light intensity relative to the substrate of $65ZrF_4$—$35BaF_2$ glass upon launching of a He—Ne laser was measured. For comparison purpose, a similar scattering distribution of a fluoride glass prepared through the conventional process is also shown in FIG. 7. The lower chart of FIG. 7 shows the scattering distribution of the $65ZrF_4$—$35BaF_2$ prepared by the process of the invention, and the upper chart in FIG. 7 shows the scattering distribution of a glass having the same composition and prepared by the conventional process.

In the X-ray diffraction chart, the fluoride glass prepared by this Example does not show a diffraction peak due to the presence of crystal. In the infrared absorption spectrum, the fluoride glass prepared by this Example does not show an absorption peak at about 2.9 $\mu$m due to the presence of OH group, whereas the fluoride glass prepared by the conventional process show an absorption due to the presence of OH group. It is appreciated from the result of infrared absorption spectrum that the fluoride glass prepared by the process of this invention is a fluoride glass in which the concentration of hydroxyl group is extremely low. It should be appreciated, by comparing the results of the fluoride glass prepared by the conventional process, that the scattering of oxides is significantly decreased. In the fluoride glass prepared by the conventional process, a portion of hydroxyl group present on the surfaces of starting materials remains and forms oxides during the melting step to be scattered in the formed glass. On the contrary, the fluoride glass of the invention is prepared through continuous steps including the step of vaporizing the starting materials and the step of formation of glass, leading to reduction of oxide impurities as shown in FIG. 7.

Figure 8:
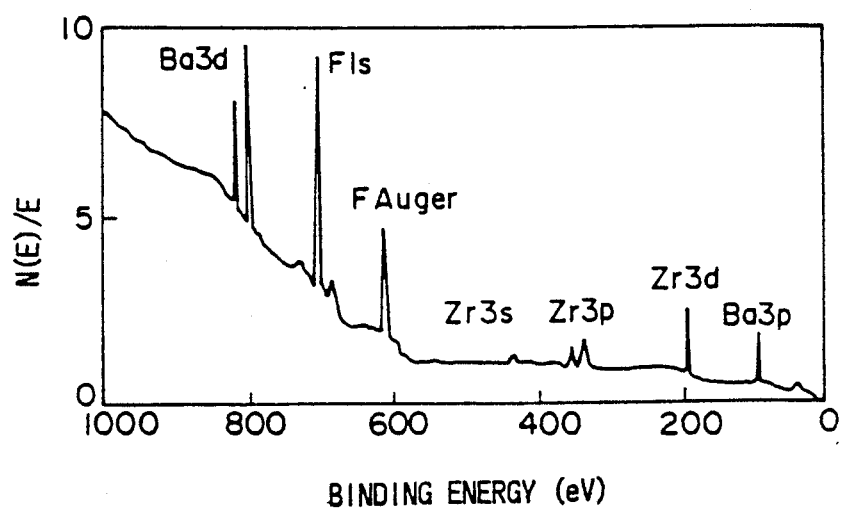
FIG. 8 is a spectrum chart showing the result of X-ray photoelectron spectroscopy of the $65ZrF_4—35$-BaF glass.

FIG. 8 is a spectrum chart showing the result of X-ray photoelectron spectroscopy of $65ZrF_4$—$35BaF_2$ glass. The fluoride glass prepared by the process of the invention is composed only of zirconium, barium and fluorine and signals showing the presence of $C_{1S}$ and $O_{1S}$ are not detected to show that no organic materials are present. It should be appreciated from the result that the reaction between a metal-$\beta$-diketonate complex and a fluorine-containing gas can be proceeded at a low temperature to prevent remaining of impurities in the resultant glass. Since the metal-$\beta$-diketonate complex in the process of this invention can be vaporized at a low temperature so that the temperature throughout the overall preparation step can be maintained at a relatively low temperature, a homogeneous glass can be prepared at a temperature lower than the crystallization temperature of the formed fluoride glass even for the preparation of fluoride glasses which have low glass transition temperatures and are thermally unstable.

Figure 9:
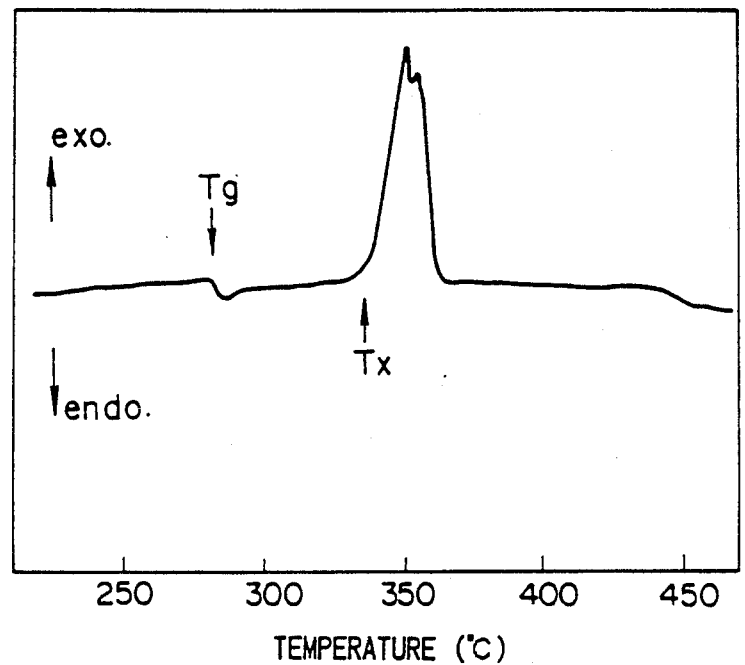
FIG. 9 is a chart showing the result of differential thermal analysis of the $65ZrF_4—35BaF_2$ glass.

By using $\beta$-diketonate complexes of other metal elements, fluoride glasses containing different metallic constituents may be prepared. The compositions of formed fluoride glasses may be easily controlled by adjusting the flow rate of argon used as the carrier gas. The result of differential thermal analysis of $65ZrF_4$—$35BaF_2$ glass is shown in FIG. 9. The glass transition temperature of the glass was 270° C. and the crystallization temperature was 330° C.

EXAMPLE 2

The same apparatus used in Example 1 and shown in FIG. 1 was used. Additional two evaporators similar to the evaporators 6a, 6b were provided and connected to the feed pipe 7b. Similarly as in Example 1, a fluoride glass was prepared. $La(DHO)_3$ was contained and maintained at 180° C. in one of the additional evaporators, and $Al(DHO)_3$ was contained and maintained at 90° C. in the other of the additional evaporators.

A 5.5 mm thick glass was deposited on a $CaF_2$ substrate for a reaction time of 2 hours. The formed fluoride glass had a composition, in mol %, $57ZrF_4$—$34Ba_2F_2$—$4.5LaF_3$—$4.5AlF_3$.

The formed fluoride glass had an improved thermal stability by the addition of $LaF_3$ and $AlF_3$, and no change in density of scatters was observed even after subjected to a heating treatment for an hour.

Figure 10:
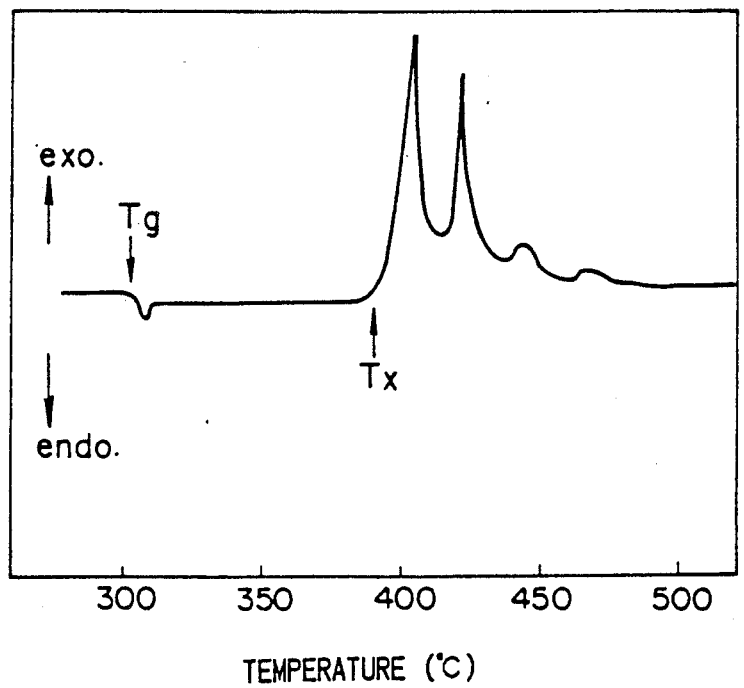
FIG. 10 is a chart showing the result of differential thermal analysis of a $57ZrF_4—34BaF_2—4.5LaF_3—4.5AlF_3$ glass.

The result of differential thermal analysis of the $57ZrF_4$—$34BaF_2$—$4.5LaF_3$—$4.5AlF_3$ glass prepared by Example 2 is shown in FIG. 10. The glass transition temperature of the glass was 301° C., and the crystallization temperature thereof was 395° C.

EXAMPLE 3

A fluoride glass was prepared similarly as in Example 2 except that triethylaluminum $Al(C_2H_5)_3$ was contained in the evaporator in place of $Al(DHO)_3$ while using a similar apparatus as used in Example 2. The evaporator containing $Al(C_2H_5)_3$ was maintained at 40° C.

A glass having a thickness of about 5.5 mm was deposited on the $CaF_2$ substrate for a reaction time of 2 hours. The formed fluoride glass had the same composition as that of the glass prepared by Example 2, the composition of the formed glass being represented by $57ZrF_4$—$34BaF_2$—$4.5LaF_3$—$4.5AlF_3$. The result of X-ray photoelectron spectroscopy revealed that no carbon was remained in the resultant glass. The results of infrared spectroscopy, X-ray diffraction, scattering distribution analysis and differential thermal analysis were equivalent to those of the glass prepared by Example 2, and it was revealed that an optically homogeneous glass could be prepared by using organic metal compounds in lieu of $\beta$-diketonate complexes. Likewise, glasses could be prepared by using 2,2-dimethyl-6,6,7,7,8,8,8-heptafluoro-3,5-octanedione (DHO) complexes of other rare earth metal elements, such as Ce, Pr, Nd, Pm, Sm, Eu, Gd, Tb, Dy, Ho, Er, Tm, Yb and Lu are used in place of the complex of La. The results of differential thermal analyses showed that the glasses had equivalent thermal stabilities. Particularly, a glass having no absorption peak within the medium infrared region was obtained by using a complex of Gd.

EXAMPLE 4

While using the same apparatus as used in Example 1 and shown in FIG. 1, three additional evaporators were provided similarly as Example 2 and a fluoride glass was prepared through a similar procedure as described in Example 2. The additional evaporators contained $La(DHO)_3$, $Al(DHO)_3$ and $Na(TMH)$ and maintained, respectively, at 180° C., 60° C. and 150° C.

A glass having a thickness of about 6.5 mm was deposited on the $CaF_2$ substrate within a reaction time of 2 hours. The formed glass had a composition represented by $51ZrF_4$—$20BaF_2$—$4.5LaF_3$—$4.5AlF_3$—$20NaF$ (in mol %).

By the addition of NaF to the fluoride glass of Example 2, the thermal stability of the fluoride glass was improved. The density of scatters was not changed even after the thermal treatment effected at 300° C. for 5 hours. The result of differential thermal analysis showed that the glass prepared by this Example had a glass transition temperature of 260° C. and a crystallization temperature of 373° C. A similar glass was prepared by using Li(TMH) in place of Na(TMH), and the formed glass containing 20 mol % of LiF was subjected to differential thermal analysis to reveal that it had a glass transition temperature of 252° C. and a crystallization temperature of 348° C.

Also the La(DHO)$_3$ was mixed, respectively, with 2,2-dimethyl-6,6,7,7,8,8,8-heptafluoro-3,5-octanedione (DHO) complexes of In, Sn, Pb, Sb, Bi, Zn, Cd, Ti, Th, Nb, Ta, Mo and Mn to prepare glasses containing 1 to 10 mol % of each of fluorides of these metals. The fluoride glasses showed a crystallization temperature shift by 2° to 15° C. to the lower temperature side, as compared to the glass of this Example. Each of these glasses had a thickness of about 5 mm and no scattering was observed.

EXAMPLE 5

A fluoride glass was prepared similarly as in Example 2 except that Hf(HFA)$_4$ was charged in the evaporator in place of Zr(HFA)$_4$. The evaporators charged with Hf(HFA)$_4$, Ba(DHO)$_2$, La(DHO)$_3$ and Al(DHO)$_3$ were maintained, respectively, at 55° C., 200° C., 180° C. and 90° C. The feed rates were 100 cc/min for Hf(HFA)$_4$, 150 cc/min for Ba(DHO)$_2$, 13 cc/min for La(DHO)$_3$, 13 cc/min for 2Al(DHO)$_3$ and 200 cc/min for HF.

The reaction was continued for 2 hours, whereby a fluoride glass having a thickness of about 5 mm was deposited on the CaF$_2$ substrate. The result of elementary analysis through the X-ray photoelectron analysis revealed that the formed glass had a composition in molar ratio of 57HfF$_4$—34BaF$_4$—4.5LaF$_3$—4.5AlF$_3$. The refractive index of the thus formed glass was $n_D = 1.50$.

The result of differential thermal analysis revealed that the glass transition temperature of the glass was 315° C. and the crystallization temperature was 403° C. Thus, an HfF$_4$ system fluoride glass having a thermal stability substantially equivalent to that of the ZrF$_4$ system glass was prepared.

EXAMPLE 6

A fluoride glass was prepared similarly as in Example 2, except that Ba(DHO)$_2$, Ca(DHO)$_2$, Y(DHO)$_3$ and Al(DHO)$_3$ were used as the starting materials and the hydrogen fluoride (HF) gas was not used as the fluorine-containing gas.

Figure 11:
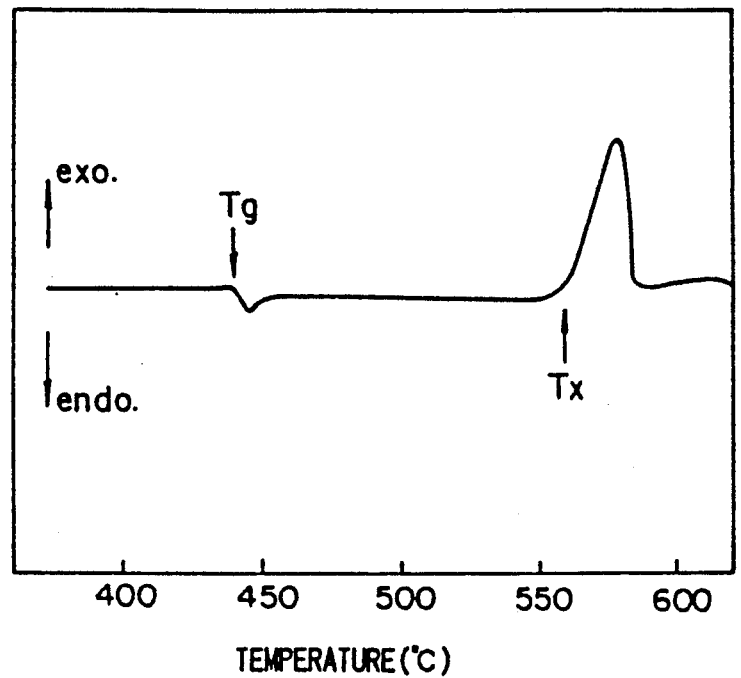
FIG. 11 is a chart showing the result of differential thermal analysis of a $22BaF_2—22CaF_2—16YF_3—40AlF_3$ fluoride glass which has been prepared without using HF gas serving as a fluorinating agent.

The evaporators charged with Ba(DHO)$_2$, Ca(DHO)$_2$, Y(DHO)$_3$ and Al(DHO)$_3$ were maintained, respectively, at 200° C., 180° C., 140° C. and 95° C. The feed rates of the metal-$\beta$-diketonate complexes were kept at 55 cc/min for Ba(DHO)$_2$, 55 cc/min for Ca(DHO)$_2$, 40 cc/min for Y(DHO)$_3$ and 100 cc/min for Al(DHO)$_3$. The temperature of the substrate was maintained at 380° C. The reaction was continued for 2 hours to obtain an about 8 mm thick fluoride glass deposited on the CaF$_2$ glass. The formed fluoride glass was analyzed by the X-ray photoelectron analysis to find that it had a composition of 22BaF$_2$—22CaF$_2$—16YF$_3$—40AlF$_3$ (molar ratio). No residual carbon was observed. It was thus found that the ligands of $\beta$-diketonate complexes used as the starting materials were decomposed in the gaseous phase to act as the fluorinating agents. Meantime, DHO is represented by 2,2-dimethyl6,6,7,7,8,8,8-heptafluoro-3,5-octanedione and thus contains fluorine atoms. The result of differential thermal analysis of the formed fluoride glass is shown in FIG. 11. The result shows that the glass transition temperature of the formed fluoride glass is 430° C., and the crystallization temperature thereof is 560° C. While the crystallization temperature of a fluoride glass having the same composition and prepared through the conventional melting process is 535° C., and thus the crystallization temperature of the fluoride glass obtained by the process of the invention is higher than that of the glass prepared by the conventional process by 25° C. This shows that the thermal stability of the fluoride glass prepared by the present invention is improved over that of the fluoride glass prepared by the conventional melting process. The improvement in thermal stability was attributed by removal of oxide impurities in the fluoride glass prepared according to the invention, the oxide impurities being not removed in the fluoride glass prepared by the conventional fusing process. The refractive index of the fluoride glass prepared by this Example was $n_D = 1.44$. Fluoride glasses were prepared by using Sr(DHO)$_2$ and Ca(DHO)$_2$ in place of Mg(DHO)$_2$ and using MgF$_2$ and SrF$_2$ as the substrate in place of CaF$_2$. About 7 mm thick glasses free of scatters were prepared.

EXAMPLE 7

A fluoride glass was deposited on the substrate while using the apparatus shown in FIG. 2. ZrBr$_4$ and Ba(pivaloyltrifluoromethylacetyacetone)$_2$ (hereinafter referred to Ba(PTA)$_2$) were introduced through the inlet 1a. ZrBr$_4$ was prepared by sublimating granular zirconium 5 from the heater 2a which was heated to 350° C. and reacting the sublimated zirconium with bromine gas.

The feed pipe 7 having the variable leak valve was connected to the container in which granular zirconium 5 was contained. Bromine gas and argon were fed to the container so that ZrBr$_4$ was sublimated by the reaction between Zr and Br$_2$, and the sublimated ZrBr$_4$ was supplied through the inlet 1a to the reaction chamber 1 together with argon. The feed pipe 7 is heated by the heater 9. The content of transition metal impurities in ZrBr$_4$ was suppressed below 1 ppb (part per billion).

On the other hand, argon acting as the carrier gas is passed through the evaporator 14 saturated with vaporized Ba(PTA)$_2$, which was vaporized from solid Ba(PTA)$_2$ and maintained at 120° C. in the evaporator 14, and through the feed pipe 11, the variable leak valve and the inlet 1a to the reaction chamber 1. A fluorine containing gas, hydrogen fluoride HF in this Example, was supplied through the feed pipe 11 and the inlet 1b to the reaction chamber 1. The feed rate of HF was adjusted by the variable leak valve. The reaction chamber 1 was maintained at 200° C. and the substrate 3 was maintained at 250° C.

ZrBr$_4$ and Ba(PTA)$_2$ introduced into the reaction chamber 1 were converted on the substrate 3 to ZrF$_4$ and BaF$_2$ as shown by the following reaction equations. In the following reaction equations, (g) indicates the gaseous state, (ad) indicates the adsorbed solid phase and (s) indicates the solid phase.

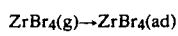

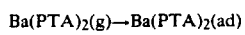

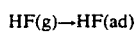

ZrBr$_4$(ad) + 4HF(ad) → ZrF$_4$(s) + 4HBr(ad)

Ba(PTA)$_2$(ad) + 2HF(ad) → BaF$_2$(S) + 2(CH$_3$)$_3$—C—CO—CH$_2$—CO—CF$_3$(ad)

HBr(ad) → HBr(g)

(CH$_3$)$_3$C—CO—CH$_2$CO—CF$_3$(ad) → (CH$_3$)$_3$C—CO—CH$_2$—CO—CF$_3$(g)

Since the temperature of the substrate is lower than the glass transition temperature of the formed fluoride glass, ZrF$_4$ and BaF$_2$ formed by the above reactions and deposited on the substrate 3 had low mobilities and then frozen in situ on the substrate 3. Accordingly, likewise in the case of quenching, a non-equilibrium state can be realized on the substrate 3. A glass bulk may be prepared by continuing deposition of the fluoride glass.

In the reactions described above, fluorinations of ZrBr$_4$ and Ba(PTA)$_2$ by HF take place independently from each other. Therefore, the production rate of ZrF$_4$ by the reaction of ZrBr$_4$—HF system and the production rate of BaF$_2$ by the reaction of Ba(PTA)$_2$—HF system are maintained also in the reaction system of ZrBr$_4$—Ba(PTA)$_2$—HF. Accordingly, the ratio of Zr/Ba in the formed glass can be easily controlled.

In this Example, the feed rates were 100 cc/min for ZrBr$_4$, 70 cc/min for Ba(PTA)$_2$ and 150 cc/min for HF. After reacting for 3 hours, a 6.5 mm thick fluoride glass having a composition of 60ZrF$_4$—40BaF$_2$ was formed.

The results of X-ray diffraction, infrared absorption spectroscopy and analysis of scattering distribution measured by launching a He—Ne laser into the glass block were substantially equivalent to those described in Example 1.

The result of radioactivation analysis of the formed fluoride glass revealed that the content of Fe, Cu, Ni. Co and Cr were less than 1 ppb (part per billion) which was the detection limit of the radioactivation analysis.

Further, by varying the feed rates of the starting materials, fluoride glasses having various compositions were prepared and the thus prepared fluoride glasses were analyzed through the fluorescent X-ray analysis. Fluoride glass blocks having widely distributed compositions ranging within 90ZrF$_4$—10BaF$_2$ to 35ZrF—65-BaF$_2$ were formed. It was hard to prepare fluoride glasses having such compositions by the conventional melting or casting processes.

EXAMPLE 8

The fluoride glass block prepared by Example 6 and having the composition of 60ZrF$_4$—40BaF$_2$ was cut to have a rod shape and the surface thereof was polished to be used as a deposition substrate.

The heating means for glass deposition was changed from heater heating to CO$_2$ laser heating and the deposition substrate was changed from CaF$_2$ to a glass rod, the remaining conditions and the used apparatus being the same as used in Example 6, whereby a fluoride optical fiber preform was prepared.

The glass rod had an outer diameter of 4 mm and a length of 300 mm. Both ends of the glass rod were clamped by chucks, and a glass was deposited on the glass rod while the glass rod was rotated at 60 rpm and moved along its longitudinal direction at a moving speed of 10 mm/min. In order to establish a desired distribution of refractive index, AlBr$_3$ was introduced in addition to ZrBr$_4$ and Ba(PTA)$_2$ to deposite serially on the glass rod substrate a fluoride glass having a composition of 58ZrF$_6$—37BaF$_2$—5AlF$_3$ which is to be used as a fluoride optical fiber preform. The feed rates of the starting materials were 30 cc/min for ZrBr$_4$, 14 cc/min for Ba(PTA)$_2$ and 2 cc/min for AlBr$_3$. The temperature of the glass rod substrate was 250° C.

The preform had a diameter of 8 mm and a length of 300 mm, and the relative refractive index difference between the core and the cladding was 0.7%. The preform was drawn into a fluoride optical fiber having a length of 500 meters. The transmission loss of the optical fiber was measured. The minimum loss was 8 db/km at 2.55 μm. The result reveals that a long fluoride optical fiber having low loss can be produced by the invention.

EXAMPLE 9

Used starting materials were Ba(DHO)$_2$ which was a complex of Ba with 2,2-dimethyl6,6,7,7,8,8,8-heptafluoro-3,5-octanedione (DHO), Zr(HFA)$_4$ which was a complex of Zr with hexafluoroacetylacetone (HFA), La(DHO)$_3$ complex, Al(DHO)$_3$ complex and Na(DHO) complex. These five starting materials, Ba(DHO)$_2$, Zr(HFA)$_4$, La(DHO)$_3$, Al(DHO)$_3$ and Na(DHO), were vaporized by heating and maintaining in the gaseous state, respectively, at 210° C., 60° C., 180° C., 70° C. and 190° C., and supplied into the reaction chamber while using argon as the carrier gas. Using the apparatus shown in FIG. 3, aluminum evaporators 8a to 8e charged respectively with complexes Ba(DHO)$_3$, Zr(HFA)$_4$, La(DHO)$_3$, Al(DHO)$_3$ and Na(DHO) were heated and argon gas was introduced into respective evaporators so that vaporized starting materials were supplied through an aluminum feed pipe 7 and the inlet 1a into the reaction chamber 1.

As a fluorine-containing gas, a mixed gas of HF(95 vol %)-F (5 vol %) was supplied through the feed pipe 4 and the inlet 1b into the reaction chamber 1.

The feed rate of the metal-β-ketonate complexes and the mixed gas could be adjusted by means of mass flow controllers.

Using heaters, the feed pipes 7a to 7e were maintained at 215° C., 65° C., 185° C., 75° C. and 195° C. in order to prevent condensation of gases.

The β-diketonate complexes of respective metals introduced into the reaction chamber 1 were converted to fluorides in a form of fine glass particles due to homogeneous nucleation in the gaseous phase.

In fluorination by HF of β-diketonate complexes of respective metals, Ba(DHO)$_2$, Zr(HFA)$_4$, La(DHO)$_3$, Al(DHO)$_3$ and Na(DHO), respective complexes are fluorinated independently so that the composition of resultant glass can be easily controlled by varying the feed rates of respective complexes.

In this Example, reaction was continued for 2 hours while maintaining the feed rates of the starting materials at 50 cc/min for Ba(DHO)$_3$, 100 cc/min for Zr(HFA)$_4$, 10 cc/min for La(DHO)$_3$, 7.5 cc/min for Al(DHO)$_3$ and 7.5 cc for Na(DHO) and 15 cc/min for HF—F$_2$ mixture gas. The composition of the fine glass particles was 53ZrF$_4$—20BaF$_2$—4LaF$_3$—3AlF$_3$—22NaF, and the formed product was deposited on the interior wall of the cylindrical glass tube 3. The composition of the cylindrical glass was 39.7ZrF$_4$—13.3HfF$_4$—18.0BaF$_2$—4.0LaF$_3$—3.0AlF$_3$—22NaF.

Figure 12:
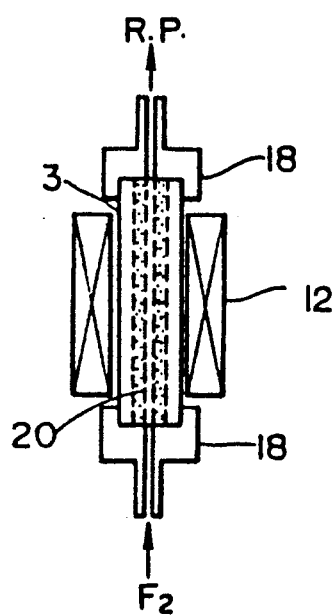
FIG. 12 is a schematic illustration showing an apparatus used for collapsing the fluoride glass according to the invention.

FIG. 12 shows schematically an apparatus used for collapsing a cylindrical tube having its interior wall deposited with fine glass particles.

Both ends of the cylindrical glass tube 3 having fine glass particles deposited over the interior wall by the process as aforementioned were allowed to contact with an aluminum connector 18, and the internal pressure of the cylindrical tube was controlled to 500 mmHg while introducing $F_2$ gas from the downside as viewed in FIG. 12 and evacuating by a rotary pump (not shown) from the upside as viewed in FIG. 12. The temperature was set to 200° C. by a heater 12, and processing was continued for 2 hours. The temperature was then raised to 280° C. to collapse entirely, whereby a preform was obtained.

In this Example, a cylindrical tube of fluoride glass having an outer diameter of 12 mm, an inner diameter of 8 mm and a length of 150 mm was used. However, by increasing the diameter of the used glass tube, the size of the preform can be further increased. For instance, a cylindrical tube having an outer diameter of 20 mm, an inner diameter of 12 mm and a length of 300 mm was used and deposition of fine glass particles was effected for 3 to 5 hours, followed by collapsing, whereby a large size collapsed preform was obtained.

In collapsing the cylindrical tube 13 deposited with fine glass particle 20, it is desirous that the temperature is maintained within the range of from 50° C. to 500° C., although the temperature may be changed corresponding to the composition of the fluoride glass.

Fluorine gas was used in this Example to remove oxide impurities absorbed on the surface of the deposited particles. However, other halogen-containing gases, such as gaseous compounds of fluorine or chlorine with hydrogen, carbon, nitrogen, boron, sulfur and silicon or mixture of at least two of said gases, may also be used for this purpose.

EXAMPLE 10

The collapsed preform prepared by Example 9 was placed in an drawing furnace filled with an inert gas, and drawn at 285° C. into a fluoride optical fiber.

A He—Ne laser was launched into the thus produced fluoride optical fiber and the scattered light intensity along the fiber axis was measured. For comparison purpose, the scattering distribution of a fluoride fiber produced by the conventional casting process was also measured. The results are shown in FIG. 13.

Figure 13:
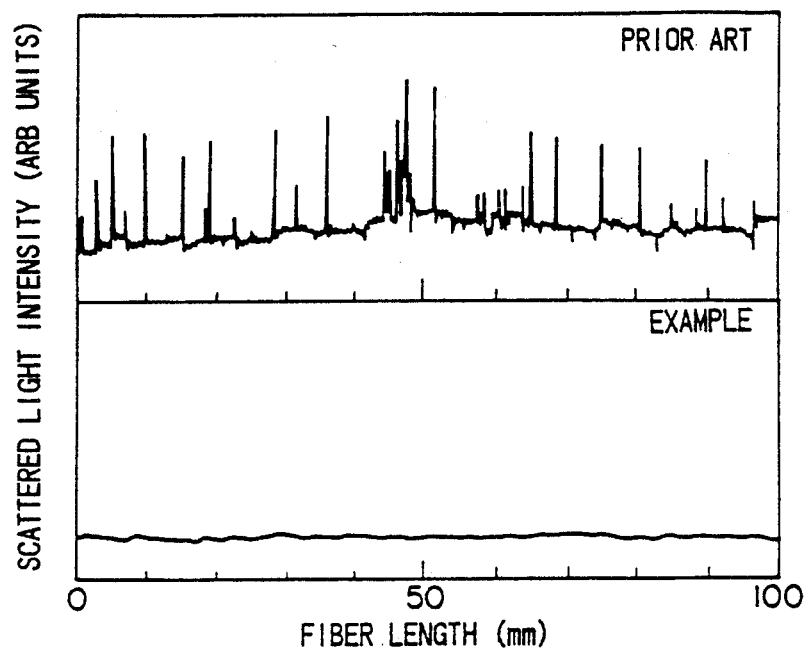
FIG. 13 are charts showing scattering characteristics along the axes of fluoride optical fibers, wherein the upper chart shows the scattering for an optical fiber prepared in accordance with the invention and the lower chart shows the scattering for an optical fiber prepared by the conventional melting process.

It is apparently seen from FIG. 13 that scatters can be significantly reduced according to the process of the invention. In the process of the invention, vaporization of the starting materials for glass and deposition or synthesis of glass particles can be effected by a single step. As an advantageous result of the single step processing, fine glass particles containing no oxide impurities could be produced. The oxide impurities adsorbed on the surface of the deposited mass could be removed by treatment with a fluorine-containing gas, without exposing to the outside atmosphere, whereby a preform was obtained.

Figure 14:
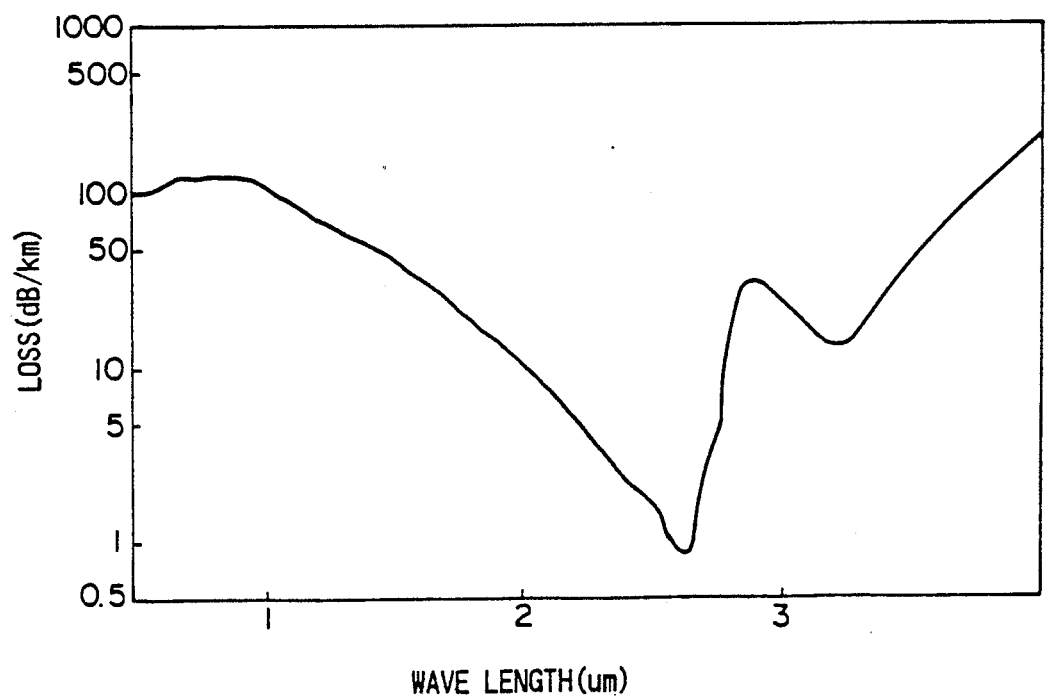
FIG. 14 is a chart showing the transmission loss spectrum of a fluoride optical fiber prepared in accordance with the invention.

The transmission loss of the produced optical fiber was measured. The result is shown in FIG. 14. The minimum loss at 2.55 μm of the produced optical fiber was 0.9 db/km which was not attainable by the conventional technology, with the length being so long as could not be produced by the conventional technology.

EXAMPLE 11

Generally following to the procedure as described in Example 9, fine particles of a fluoride glass constituting the core composition was deposited over the interior wall of a glass tube 3 constituting the cladding glass composition. The glass tube was then placed in an drawing furnace where it was processed at 200° C. for an hour in a flowing $F_2$ gas stream. Thereafter, the internal pressure was set to 700 Torr by evacuating the interior of the tube from the upper end which was connected to a rotary pump. The drawing furnace was heated to 285° C. and the glass tube was elongated simultaneously with collapsing operation to obtain a fluoride optical fiber having a minimum loss of 0.7 db/km at 2.55 μm. A long fluoride optical fiber having a low loss factor was produced by the Example, by simultaneous drawing and collapsing. Similar effects can be obtained by using $Cl_2$, HF, HCl, $BF_3$, $SF_6$, $SiF_4$, $CF_4$ or a mixture thereof in place or in addition of $F_2$ in the processing step with a halogen-containing gas carried out prior to the drawing step.

EXAMPLE 12

A fluoride optical fiber was produced similarly as in Example 10 except that a Teflon (Trade name) FEP tube was used in place of the glass tube.

In addition to the metal-β-diketonate complexes used in Example 10, $Hf(HFA)_4$ was used. The feed rates of respective metal-β-diketonate complexes are set forth below:

| | |
|---|---|
| $Zr(HFA)_4$ | 87.5 cc/min |
| $Hf(HFA)_4$ | 12.5 cc/min |
| $Ba(DHO)_2$ | 45 cc/min |
| $La(DHO)_3$ | 10 cc/min |
| $Al(DHO)_3$ | 7.5 cc/min |
| $Na(DHO)$ | 40 cc/min |

The flow rate of HF—$F_2$ was 100 cc/min. Glass particles were deposited over the interior wall of the FEP (fluoroethylene pipe) tube. The deposited fine glass particles had a composition of $39.7ZrF_4$—$13.3HfF_2$—$18.0BaF_2$—$4.0LaF_3$—$3.0AlF_3$$22NaF$. Thereafter, feeding of $Hf(HFA)_4$ was stopped to form a core layer. Then, in order to form a core layer, feed rates of respective metal-β-diketonate complexes were adjusted to the rates as set forth below:

| | |
|---|---|
| $Zr(HFA)_4$ | 100 cc/min |
| $Ba(DHO)_2$ | 50 cc/min |
| $La(DHO)_3$ | 10 cc/min |
| $Al(DHO)_3$ | 7.5 cc/min |
| $Na(DHO)$ | 40 cc/min |

The deposition was effected for 2 hours with the flow rates of the starting materials as set forth above and the flow rate of HF—$F_2$ was set to 100 cc/min. The composition of the formed glass was $53ZrF_4$—$20BaF_2$—$4LaF_3$—$3AlF_3$—$22NaF$.

The fluoride glass deposited on the interior wall of the FEP (fluoroethylene pipe) tube and including the cladding layer and core layer was drawn similarly as described in Example 10. The thus produced fluoride optical fiber covered by a Teflon FEP had a long size and a low transmission loss. The core/cladding diameter ratio may be freely changed by varying the times for deposition of fine fluoride glass particles for the formations of core and cladding layers.

EXAMPLE 13

Aluminum was coated by vapor deposition over the interior wall of a tube made of an oxide glass having a composition of 22B$_2$O$_3$—48PbO—30Tl$_2$O$_3$. This oxide glass tube was used in place of the FEP tube as used in Example 12. The following procedure was the same as described in Example 12 to deposit fluoride glasses followed by collapsing and drawing to produce fluoride optical fiber having a appreciable length and low loss. The cylindrical tube used as the substrate on which fine particle of fluoride glass is deposited, may be a single layer or multi-layered cylindrical tube made of any of glasses, metal and organic polymers.

What is claimed is:

1. A process for preparing a fluoride glass containing barium and at least one other metal glass forming element comprising providing a gaseous mixture in a reaction vessel containing a substrate to react the ingredients of said gaseous mixture on said substrate or in gaseous phase to deposit metal fluoride to form a fluoride glass, said gaseous mixture comprising:

a barium β-diketonate complex consisting of barium and beta-diketone selected from the group consisting of (i) those represented by the following general formula (1);

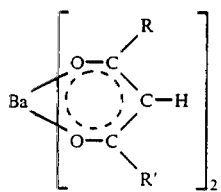

(1)

wherein R is an alkyl group having 1 to 7 carbon atoms, R' is a substituted alkyl group having fluorine atoms substituting hydrogen atoms and represented by C$_n$F$_{2n+1}$ where n is an integer of from 1 to 3, a gaseous compound of said at least one other metal comprising at least one selected from the group consisting of metal halide, trimethyl aluminum, triethyl aluminum and metal β-diketonate other than a barium β-diketonate; and a fluorine-containing gas serving as fluorinating agent.

2. The process according to claim 1, wherein said β-diketone is, 5,5,5-trifluoro-2,4-pentanedione, 2,2dimethyl-6,6,6-trifluoro-3,5-hexanedione, 2,2-dimethyl-6,6,7,7,7-pentafluoro-3,5-heptanedione, or 2,2-dimethyl-6,6,7,7,8,8,8-heptafluoro-3,5-octanedione.

3. The process according to claim 1 wherein said at least one other metal element constituting said fluoride glass is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

4. The process according to claim 1, wherein said fluorine-contained gas is fluorine gas or a gaseous compound of fluorine with any one or more of hydrogen, halogens, carbon, nitrogen, boron, silicon and sulfur.

5. The process according to claim 1, wherein said substrate is fluoride glass, CaF$_2$, metal, oxide glass, polymer or multi-layer thereof.

6. The process according to claim 1, wherein said fluoride glass is a BaF$_2$—ZrF$_4$ system, BaF$_2$—HfF$_4$ system or BaF$_2$—AlF$_3$ system glass.

7. The process according to claim 1, wherein said gaseous compound is at least one selected from the group consisting of metal halide and metal beta-diketonate complex and wherein said metal is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

8. A process for preparing a fluoride glass containing barium and at least one other metal glass forming element comprising providing a gaseous mixture in a reaction vessel containing a substrate to react the ingredients of said gaseous mixture in the gaseous phase on said substrate to deposit metal fluoride to form a fluoride glass, said gaseous mixture comprising:

a barium β-diketonate complex consisting of barium and beta-diketone and serving a first starting material and represented by the following general formula (1):

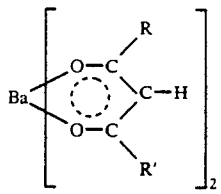

wherein R is an alkyl group having 1 to 7 carbon atoms, R' is a substituted alkyl group having fluorine atoms substituting hydrogen atoms and represented by C$_n$F$_{2n+1}$ wherein n is an integer of from 1 to 3, and a gaseous compound of said at least one other metal comprising at least one selected from the group consisting of metal halide, trimethyl aluminum, triethyl aluminum and metal beta-diketonate complex.

9. The process according to claim 8 wherein said β-diketone is, 5,5,5-trifluoro-2,4-pentanedione, 2,2dimethyl-6,6,6-trifluoro-3,5-hexanedione, 2,2-dimethyl-6,6,7,7,7-pentafluoro-3,5-heptanedione, or 2,2-dimethyl-6,6,7,7,8,8,8-heptafluoro-3,5-octanedione.

10. The process according to claim 8, wherein said at least one other metal element constituting said fluoride glass is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

11. The process according to claim 8 wherein said fluoride glass is a BaF$_2$—ZrF$_4$ system, BaF$_2$—HfF$_4$ system or BaF$_2$—AlF$_3$ system glass.

12. The process according to claim 8, wherein said gaseous compound is at least one selected from the group consisting of metal halide and metal beta-didetonate complex and wherein said metal is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

13. A process for preparing a fluoride glass containing barium and at least one other metal glass forming element comprising providing a gaseous mixture in a reaction vessel containing a rod-like glass substrate to react the ingredients of said gaseous mixture in a gaseous phase or on said substrate to deposit a layer or fine particles of fluoride glass on the surface of said substrate, said gaseous mixture comprising:

a barium β-diketonate complex consisting of barium and beta-diketone and serving a first starting material and represented by the following general formula (1):

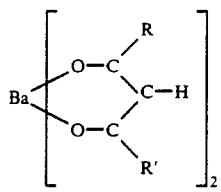

wherein R is an alkyl group having 1 to 7 carbon atoms, R' is a substituted alkyl group having fluorine atoms substituting hydrogen atoms and represented by $C_nF_{2n+1}$ wherein n is an integer of from 1 to 3;

a gaseous compound of said at least one other metal comprising at least one selected from the group consisting of metal halide, trimethyl aluminum, triethyl aluminum and metal beta-diketonate complex;

a fluorine-contained gas serving as a fluorinating agent; and heating said rod-like glass substrate containing thereon said deposited layer or deposited fine particles of a fluoride glass to solidify the same to form a pre-form for optical fibers.

14. The process according to claim 13, wherein hydrogen fluoride gas is said fluorinating agent.

15. The process according to claim 13, wherein said substrate is cylindrical and has an interior wall and the fluoride glass is deposited on the interior wall of said cylindrical substrate and is heated in an environment of fluorine or chlorine or gaseous compounds of fluorine or chlorine with any one or more of hydrogen, carbon, nitrogen, boron, sulfur and silicon or mixture of at least two of said gases.

16. The process according to claim 15, further comprising the step of drawing said preform to form a drawn optical fluoride fiber.

17. The process according to claim 13, further comprising the step of drawing said preform to form a drawn optical fluoride fiber.

18. The process according to claim 13, wherein said fluoride glass is a $BaF_2$—$ZrF_4$ system, $BaF_2$—$HfF_4$ system or $BaF_2$—$AlF_3$ system glass.

19. The process according to claim 13, wherein said at least one other metal element constituting said fluoride glass is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

20. The process according to claim 13, wherein said β-diketone is, 5,5,5-trifluoro-2,4-pentanedione, 2,2dimethyl-6,6,6-trifluoro-3,5-hexanedione, 2,2-dimethyl-6,6,7,7,7-pentafluoro-3,5-heptanedione, or 2,2-dimethyl-6,6,7,7,8,8,8-heptafluoro-3,5-octanedione.

21. The process according to claim 13, wherein said gaseous compound is at least one selected from the group consisting of metal halide and metal beta-diketonate complex and wherein said metal is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

22. A process for preparing a fluoride glass containing barium and at least one other metal glass forming element comprising reacting a gaseous mixture in a reaction vessel containing a substrate, said gaseous mixture comprising the following components a gaseous barium-beta-diketonate complex of one mole of barium with two moles of a diketone having the formula R—CO—$CH_2$—CO—R', wherein R is an alkyl group having 1 to 7 carbon atoms, R' is a fluorinated alkyl group having the formula $C_nF_{2n+1}$ and n is 1–3;

a gaseous compound of said at least one other metal comprising at least one selected from the group consisting of metal halides and organic metal compounds; and a fluorine-containing gas fluorinating agent;

whereby components of said gaseous mixture react and deposit a fluoride glass on said substrate, said fluoride glass comprising the fluorides of barium and said at least one other metal glass forming element.

23. The process according to claim 22, wherein said gaseous compound is at least one selected from the group consisting of trimethyl aluminum, triethyl aluminum and metal beta-diketonate complex.

24. The process according to claim 23, wherein said metal beta-diketonate complex is a complex of said at least one other metal glass forming element and a beta-diketone selected from the group consisting of 5,5,5-trifluoro-2,4-pentanedione, 2,2dimethyl-6,6,6-trifluoro-3,5-hexanedione, 2,2dimethyl-6,6,7,7,7-pentafluoro-3,5-heptanedione, and 2,2-dimethyl-6,6,7,7,8,8,8-heptafluoro-3,5-octanedione.

25. The process according to claim 24, wherein said fluorine-containing gas is fluorine or hydrogen fluoride.

26. The process according to claim 25, wherein said gaseous compound is at least one selected from the group consisting of trimethyl aluminum, triethyl aluminum and metal beta-diketonate complex and wherein said metal is at least one selected from the group consisting of Zr, Ca, Al, Na, Li, Hf, Y, La, Ce, Pr, Nd, Pm, Sm, Eu, Gd, Tb, Dy, Ho, Er, Tm, Yb, Lu, In, Sn, Pb, Sb, Bi, Zn, Cd, Ti, Th, Nb, Mo and Mn.

27. The process according to claim 26 wherein said fluoride glass is a $BaF_2$—$F_4$ system, $BaF_2$—$HfF_4$ system or $BaF_2$—$AlF_3$ system glass.

28. The process according to claim 27, wherein said gaseous compound is at least one metal beta-diketonate.

* * * * *

UNITED STATES PATENT AND TRADEMARK OFFICE
CERTIFICATE OF CORRECTION

PATENT NO. : 5,071,460

DATED : December 10, 1991

INVENTOR(S) : FUJIURA et al

It is certified that error appears in the above-identified patent and that said Letters Patent is hereby corrected as shown below:

Column 1, line 36, before "obstacle", insert
--are an--; same line, before "practical", insert --to--.

Column 3, line 43, delete "deposite", and insert
--deposit--.

Col. 10, line 18, delete "vaporization", and insert
--vaporizable materials are--.

Column 10, line 54, delete "$BaF_4$", and insert -- $BaF_2$ --.

Column 13, line 29, delete "$2AL(DHO)_3$", and insert
-- $Al(DHO)_3$ --.

Column 16, line 29, delete "$Ba(DHO)_3$", and insert
-- $Ba(DHO)_2$ --.

UNITED STATES PATENT AND TRADEMARK OFFICE
CERTIFICATE OF CORRECTION

PATENT NO. : 5,071,460

DATED : December 10, 1991

INVENTOR(S) : FUJIURA et al

It is certified that error appears in the above-indentified patent and that said Letters Patent is hereby corrected as shown below:

Column 16, line 56, delete "$Ba(DHO)_3$", and insert -- $Ba(DHO)_2$ --.

Signed and Sealed this

Thirteenth Day of September, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,071,460

DATED : December 10, 1991

INVENTOR(S) : FUJIURA, et al

It is certified that error appears in the above-indentified patent and that said Letters Patent is hereby corrected as shown below:

Column 13, line 35: delete "$34BaF_4$" and insert --$34BaF_2$--.

Signed and Sealed this

Twenty-first Day of March, 1995

Attest:

BRUCE LEHMAN

Attesting Officer

Commissioner of Patents and Trademarks